United States Patent
Zielinski et al.

(10) Patent No.: US 10,255,101 B2
(45) Date of Patent: Apr. 9, 2019

(54) DEVICE EMULATOR

(71) Applicants: Marek Piotr Zielinski, Pretoria (ZA);
Jan Harm Petrus Eloff, Pretoria (ZA);
Martin Przewloka, Buseck (DE)

(72) Inventors: Marek Piotr Zielinski, Pretoria (ZA);
Jan Harm Petrus Eloff, Pretoria (ZA);
Martin Przewloka, Buseck (DE)

(73) Assignee: SAP SE, Walldorf (DE)

( * ) Notice: Subject to any disclaimer, the term of this patent is extended or adjusted under 35 U.S.C. 154(b) by 553 days.

(21) Appl. No.: 14/567,455

(22) Filed: Dec. 11, 2014

(65) Prior Publication Data
US 2016/0170779 A1    Jun. 16, 2016

(51) Int. Cl.
G06F 9/46      (2006.01)
G06F 13/10    (2006.01)
G06F 9/4401  (2018.01)

(52) U.S. Cl.
CPC ............ G06F 9/461 (2013.01); G06F 9/4411 (2013.01); G06F 13/10 (2013.01)

(58) Field of Classification Search
CPC ........ G06F 9/461; G06F 9/4401; G06F 13/10; G06F 9/4411
See application file for complete search history.

(56) References Cited

U.S. PATENT DOCUMENTS 8,013,837 B1 * 9/2011 Schroeder ............. G06F 3/0362
                                                                345/157
8,115,777 B2 * 2/2012 Jain ........................ G09B 21/00
                                                                345/593

(Continued)

FOREIGN PATENT DOCUMENTS

GB    2466077 A  *  6/2010  ............. G06F 3/038

OTHER PUBLICATIONS

Kotze, et al. "Accessible Computer Interaction for People with Disabilities: the case for quadriplegics." ICEIS 2004—Human-Computer Interaction, pp. 97-106 [retrieved on Mar. 29, 2017]. Received from <https://pdfs.semanticscholar.org/7d2b/093292ee38e013328a904111004d717ece0a.pdf>.*

(Continued)

*Primary Examiner* — Aniss Chad
*Assistant Examiner* — Alfred H B Wechselberger
(74) *Attorney, Agent, or Firm* — Fish & Richardson P.C.

(57) ABSTRACT

The disclosure generally describes computer-implemented methods, software, and systems, including a method for emulating a device. A set of current external device context states is identified. Each current external device context state is associated with one or more particular ones of a plurality of external devices. The external devices are used in combination to emulate operations of an emulated device. An emulated device context state corresponding to the identified set of current external device context states is determined. The determining uses an external device context state rule that maps the identified set of current external device context states to the emulated device context state. A command is generated for use by a target device in performing operations on the target device. The generating uses an emulated device context state rule that maps the determined emulated device context state to the command. The command is transmitted to the target device.

10 Claims, 6 Drawing Sheets

(56) References Cited

U.S. PATENT DOCUMENTS

| | | | | |
|---|---|---|---|---|
| 8,527,908 | B2* | 9/2013 | Pance et al. | G06F 1/3231 |
| | | | | 715/863 |
| 8,533,774 | B2 | 9/2013 | Zielinski et al. | |
| 8,756,120 | B2 | 6/2014 | Ntawanga et al. | |
| 9,250,703 | B2* | 2/2016 | Hernandez-Abrego | ..................... |
| | | | | A63F 13/213 |
| 2009/0213083 | A1* | 8/2009 | Dicker | G06F 3/038 |
| | | | | 345/173 |
| 2014/0282282 | A1* | 9/2014 | Holz | G06F 3/0304 |
| | | | | 715/863 |
| 2014/0342324 | A1* | 11/2014 | Ghovanloo | G09B 5/06 |
| | | | | 434/185 |

OTHER PUBLICATIONS

"HID Architecture." Windows Dev Center—Hardware, Design Guide, Overview [retrieved on Apr. 7, 2017]. Recevied from <https://web.archive.org/web/20130814152815/http://msdn.microsoft.com/enus/library/windows/hardware/jj126193(v=vs.85).aspx>.*

"Simplified Description of USB Enumeration." FTDI Chip: Technical Note TN-113, Document Reference FT_000180, Version 1.0, Oct. 2009 [retrieved on Apr. 7, 2017]. Retrieved from <http://www.ftdichip.com/Support/Documents/TechnicalNotes/TN_113_Simplified%20Description%20of%20USB%20Device%20Enumeration.pdf>.*

"Tutorial about USB HID Report Descriptors." Eleccelerator: The website of Frank Zhao, Nov. 2014 [retreived on Apr. 11, 2017]. Retreived from <https://web.archive.org/web/20141116024508/http://eleccelerator.com/tutorialaboutusbhidreportdescriptors>.*

"HID Usage Tables." USB Implementer's Forum, Oct. 2004, Version 1.12 [retrieved on Apr. 7, 2017]. Retrieved from <http://www.usb.org/developers/hidpage/Hut1_12v2.pdf>.*

"USB human interface device class." Wikipedia, Oct. 2014 [retrieved on Apr. 12, 2017]. Retreived from <https://en.wikipedia.org/w/index.php?title=USB_human_interface_device_class&oldid=628643281>.*

"Device Class Definition for Human Interface Devices (HID)." USB Implementers' Forum, Firmware Specification Jun. 27, 2001, Version 1.11 [retrieved on Mar. 30, 2017]. Retreived from <http://www.usb.org/developers/hidpage/HID1_11.pdf>.*

"Universal Serial Bus Specification." Version 1.1, Sep. 1998 [retreived on Apr. 12, 2017]. Retreived from <http://esd.cs.ucr.edu/webres/usb11.pdf>.*

Tronconi, et al. "New Technologies for Physically Disabled Individuals." Transactions on Emerging Telecommunications Technologies, vol. 1, No. 6 (1990), doi: 10.1002/ett.4460010608 [retrieved on Sep. 19, 2017]. Retrieved from <http://onlinelibrary.wiley.com/doi/10.1002/ett.4460010608/full>.*

Grauman, et al. "Communication via eye blinks and eyebrow raises: video-based human-computer interfaces." Universal Access in the Information Society, vol. 2, Issue 4 (2003) [retrieved on Sep. 19, 2017]. Retrieved from <https://link.springer.com/article/10.1007%2Fs10209-003-0062-x?LI=true>.*

Man, et al. "Evaluation of Computer-Access Solutions for Students With Quadriplegic Athetoid Cerebral Palsy." The American Journal of Occupational Therapy, vol. 61 (2007), doi: 10.5014/ajot.61.3.355 [retrieved on Sep. 19, 2017]. Retrieved from <https://ajot.aota.org/article.aspx?articleid=1866966>.*

Pereira, et al. "Development and Evaluation of a Head-controlled Human-computer Interface with Mouse-Like Functions for Physically Disabled Users." Clinics, vol. 64, No. 10 (2009), doi: 10.1590/S1807-59322009001000007 [retrieved from Sep. 19, 2017]. Retrieved from <http://www.scielo.br/scielo.php?pid=S1807-59322009001000007&script=sci_arttext>.*

Kim, et al. "Tongue-Operated Assistive Technology with Access to Common Smartphone Applications via Bluetooth Link." 34th Annual International Conference of the IEEE EMBS; San Diego, CA (Aug. 28-Sep. 1, 2012) [retrieved on Sep. 19, 2017]. Retrieved from <http://ieeexplore.ieee.org/abstract/document/6346857/>.*

Gao, et al. "Assist Disabled to Control Electronic Devices and Access Computer Functions by Voice Commands." Proceedings of the 1st International Convention on Rehabilitation Engineering and Assistive Technology (Apr. 2007, Singapore), doi: 10.1145/1328491.1328502 [retrieved on Sep. 19, 2017]. Retrieved from <http://dl.acm.org/citation.cfm?id=13285>.*

Brown, Carl. "Assistive Technology Computers and Persons with Disabilities." Communications of the ACM, vol. 35, No. 5, doi: 10.1145/129875.129877 (1992) [retrieved on Sep. 19, 2017]. Retrieved from <http://dl.acm.org/citation.cfm?id=129877>.*

Zhang et al. "Designing a Robust Speed and Gaze Multimodel System for Diverse Users." Information Reuse and Integration (2003) [retrieved on Feb. 1, 2018]. Retrieved from <http://ieeexplore.ieee.org/document/1251437/#full-text-section>.*

Kaur, et al. "Where is 'it'? Event Synchronization in Gaze-Speech Input Systems." 5th International Conference on Multimodel Interfaces (2003) [retrieved on Feb. 1, 2018]. Retrieved from <https://dl.acm.org/citation.cfm?id=958463>.*

Azmi et al. "The Wiimote with SAPI: Creating an Accessible Low-Cost, Human Computer Interface for the Physically Disabled." IJCSNS International Journal of Computer Science and Network Security, vol. 9, No. 12 (2009) [retrieved on Jan. 30, 2018]. Retrieved from <http://paper.ijcsns.org/07_book/200912/20091210.pdf>.*

Chin et al. "Integrated electromyogram and eye-gaze tracking cursor control system for computer user with motor disabilities." Florida International University, Electrical and Computer Engineering Faculty Publications (2008) [retrieved on Jan. 30, 2018]. Retrieved from <http://digitalcommons.fiu.edu/cgi/viewcontent.cgi?article=1026&context=ece_fac>.*

Koons et al. "Integrating Simultaneous Input from Speech, Gaze and Hand Gestures." Proceedings 1991 International Conference on Intelligent Multimedia Interfaces, pp. 257-276 [retrieved on Feb. 1, 2018]. Retrieved from <https://www.researchgate.net/profile/Kristinn_Thorisson2/publication/221606382_Integrating_Simultaneous_Input_from_Speech>.*

Castellina et al. "Integrated Speech and Gaze Control for Realistic Desktop Environment." Proceedings of the 2008 symposium on Eye tracking research & applications, pp. 79-82 [retrieved on Feb. 1, 2018]. Retrieved from <https://dl.acm.org/citation.cfm?id=1344492>.*

Lui et al. "Development and evaluation of a dual-output vocal cord vibration switch for persons with multiple disabilities" Disability and Rehabilitation: Assist Tech, vol. 7, No. 1, pp. 82-88 [retrieved on Aug. 22, 2018]. Retrieved from <https://www.tandfonline.com/doi/abs/10.3109/17483107.2011.557467> (Year: 2012).*

Ntoa et al. "Scanning-based interaction techniques for motor impaired users" Assistive Tech and Comp Access for Motor Disab, Chap 3, doi: 10.4018/978-1-4666-4438-0.ch003 [retrieved on Aug. 22, 2018]. Retrieved from <https://www.igi-global.com/chapter/scanning-based-interaction-techniques-motor/78424> (Year: 2013).*

How to combine multiple audio interfaces by creating an aggregate device; http://support.apple.com/kb/ht3956; recovered from the web Oct. 28, 2014; 5 pages.

* cited by examiner

DEVICE EMULATOR

BACKGROUND

The present disclosure relates to emulating devices.

Consider a disabled person who is unable to use a computer mouse. The person (hereafter called a "user") may interact with a computer through different means, for example, by using a motion-sensing device to emulate the movement of a mouse. Each user's disability may be unique (e.g., neck and back injuries do not always affect the same areas of the body). As such, the motion-sensing device could be attached to a user's head, wrist, or finger, depending on which parts of the body the user is able to control. In cases where a user's disability is of a progressive nature, the user's ability to interact with a computer mouse may be further restricted. Alternatively, if a user's disability is of a temporary nature, the user's ability to interact with a computer may improve over time.

In addition, due to the unique nature of a user's disability, some movement of a hand or wrist may not be possible. Hence, more than one movement of a single motion-sensing device may need to be carried out by a user to emulate a single mouse movement. It is also possible for disabled users to have a need to interact with more than one motion-sensing device to emulate the use of a mouse. For example, a motion-sensing device attached to the user's left hand could be used to emulate horizontal mouse movements, while a motion-sensing device attached on the user's right hand could emulate vertical mouse movements.

SUMMARY

The disclosure generally describes computer-implemented methods, software, and systems for emulating devices. For example, a set of current external device context states is identified. Each current external device context state is associated with one or more particular ones of a plurality of external devices. The plurality of external devices are used in combination to emulate operations of an emulated device. An emulated device context state corresponding to the identified set of current external device context states is determined. The determining uses an external device context state rule that maps the identified set of current external device context states to the emulated device context state. A command is generated for use by a target device in performing at least one operation on the target device. The generating uses an emulated device context state rule that maps the determined emulated device context state to the command. The generated command is transmitted to the target device.

The present disclosure relates to computer-implemented methods, software, and systems for emulating devices. One computer-implemented method includes: identifying a set of current external device context states, each current external device context state associated with one or more particular ones of a plurality of external devices, wherein the plurality of external devices are used in combination to emulate operations of an emulated device; determining an emulated device context state corresponding to the identified set of current external device context states, the determining using an external device context state rule that maps the identified set of current external device context states to the emulated device context state; generating a command for use by a target device in performing at least one operation on the target device, the generating using an emulated device context state rule that maps the determined emulated device context state to the command; and transmitting the generated command to the target device.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with any of the previous aspects, the external device context state rules and the emulated device context state rules are predefined at an initialization stage.

In a second aspect, combinable with any of the previous aspects, the initialization stage includes: receiving an identification of the plurality of external devices; receiving a description of at least one combination of inputs associated with each of the plurality of external devices relevant to the external device context states; receiving information associated with at least one emulated operation of the emulated device associated with each of the at least one combination of inputs; generating an external device context state rule associated with context states of the external devices, each external device context state rule mapping context states of one or more external devices to a single context state of an emulated device; generating one or more emulated device context state rules associated with context states of the emulated device, each emulated device context state rule mapping a respective context state of an emulated device to a command to be provided to a target device; and storing the one or more external device context state rules and the one or more emulated device context state rules.

In a third aspect, combinable with any of the previous aspects, the initialization stage further includes: receiving an identification of a particular interaction design pattern from a set of candidate interaction design patterns, each interaction design pattern identifying a configuration of external devices and including default information for context states and external device context state rules associated with the external devices and emulated device context state rules associated with the emulated devices; and using information associated with the identified particular interaction design pattern to facilitate the initialization stage.

In a fourth aspect, combinable with any of the previous aspects, the generated command is transmitted to a device driver at the target system in a format compatible with the device driver.

In a fifth aspect, combinable with any of the previous aspects, the emulated device is a mouse, a trackball, a keyboard, a touchpad, a speaker, a motion-sensing device, a composite device, or a game controller.

In a sixth aspect, combinable with any of the previous aspects, each current external device context state includes one or more context state parameters related to the corresponding external device.

In a seventh aspect, combinable with any of the previous aspects, context state parameters are selected from a group comprising an x-, y-, or z-coordinate associated with a particular external device, a sound received at a particular external device, a pressure received at a particular external device, a type and a number of controls pressed or selected on a particular external device, a frequency with which the controls are pressed or selected, a specific pattern or sequence associated with the pressing or selecting of controls, a speed at which the controls are pressed or selected, an amount of time passed between the pressed or selected controls, a number of pressure points detected on an external device, a speed and direction in which an external device is moved, or a pattern or shape created while moving an external device.

In an eighth aspect, combinable with any of the previous aspects, the emulated device is of the same type as at least one of the plural external devices.

In a ninth aspect, combinable with any of the previous aspects, identifying the set of current external device context states is performed in response to detecting a change in the current context state of at least one of the plurality of external devices.

In a tenth aspect, combinable with any of the previous aspects, more than one emulated device can be emulated using one or more of the same external devices.

In an eleventh aspect, combinable with any of the previous aspects, the emulated device is a virtual emulated device.

The subject matter described in this specification can be implemented in particular implementations so as to realize one or more of the following advantages. First, user customization is facilitated, such as to utilize unique abilities of users, user preferences, and unique hardware capabilities of host devices, such as devices without a touch screen. For example, emulation can occur for unique devices that may not be on the market, e.g., creating emulated devices customized to the unique needs and abilities of users. Second, there is no need to interface with the existing application which the user is using on the host operating system in order to use the invention. For example, the interaction with the application that the user is using can proceed normally, simplifying interaction of applications with the group of external devices that emulate a single device. Third, there is also no need to change the operating system of a target device for emulation to occur. For example, emulation can be simplified because all that is needed for emulation is a device driver, e.g., on the target device, that will receive input from the emulated device application and pass it to the operating system. Fourth, emulation can be transparent to the operating system of the target device. For example, the emulation can provide the sensation that the user is actually using a real hardware device. The emulation can occur, for example, for an existing hardware device (e.g., a mouse) or for a hardware device that does not exist, such as a mouse with multiple scroll wheels or a unique device customized for the unique preferences, abilities and disabilities of an individual user.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for emulating devices. For example, device emulation can enable a disabled person (or "user") to interact with a computer by using one or more motion-sensing devices. For emulation to occur, various events can occur and/or conditions can be met. First, the number, type and direction of movement(s) can be detected. Detecting movement can also include, for example, a general shape created by a movement of the user's motion-sensing device(s). Second, each movement can be interpreted as a unique computer interaction input, e.g., based on the user's unique disability. For example, the way in which the unique input is interpreted depends on the type of input device that the user's motion-sensing devices emulate (e.g., a keyboard or mouse). Third, the interpreted input can be conveyed to the computer (or other device, such as a mobile smart phone) with which the user is interacting. Devices that can be emulated include, but are not limited to, a mouse, a trackball, a keyboard, a touchpad, a speaker, a motion-sensing device, a composite device, or a game controller.

As an example, consider a user of a desktop computer that has a display device that is not a touch screen. Also consider that the user has a motion-sensing device, such as a mobile smart phone equipped with one or more motion sensors (e.g., accelerometer, gyroscope, compass, or barometer). If the motion-sensing device is enabled to communicate with the user's desktop computer, and the motion-sensing device is attached to (or held by) the user's hand, then the user's hand movements can be detected by the device. The detected hand movements can be interpreted as mouse cursor movement on the user's desktop computer display. This can allow the user to interact with the desktop computer using hand movements, allowing emulation of a touch screen for the desktop computer. The emulation can also allow the use of hand gestures of the user as a means of interaction, e.g., without the need to equip the desktop computer with gesture-sensing devices.

In the previous example, it is also possible to use a user's mobile smart phone touch screen to emulate a keyboard, e.g., to provide input into the user's laptop computer. Emulation of a keyboard can be useful, for example, in cases in which a user wishes to use a numeric keypad with a laptop that is not equipped with a numeric keypad. In this type of emulation, the user can use a mobile smart phone, for example, to provide input without the need to purchase a separate portable (or external) numeric keypad. The user can also customize the numeric keypad's representation on the mobile smart phone by, e.g., specifying arrangements of controls/buttons and adding additional controls/buttons, e.g., controls/buttons that the user considers useful that are not normally found on numeric keypads. Numeric keypad emulation can also be useful when a user is interacting with an application executed on, for example, a tablet device. For example, in some typical/conventional applications, when keyboard input is required, the small screen of the tablet may be shared between the application and a keyboard. This may reduce the usability of the application, as the user sees only a portion of the whole application. However, by using a keyboard emulated by the user's mobile phone, keyboard input can be provided to the user's tablet device (operating as an external device) without reducing the display area dedicated to the application executing on the tablet device.

In some implementations, the use of a device (e.g., not originally intended for the functionality which the devices emulate) can be enabled using the following. First, a definition can be provided that defines how external devices, and which of their functionality subsets, are to be combined to create input data for the device that is emulated. Second, the input from the devices is detected and interpreted as a unique computer interaction input. For example, the unique input that is interpreted can depend on the type of input device that is being emulated (e.g., track pad, numeric keyboard, or other device). Third, the interpreted input is conveyed to a target device, such as the computer, mobile smart phone, or other device with which the user is interacting. For example, the interpreted input is matched to a command that is the same as the emulated device would provide, and the command is conveyed to the target device to perform the same operation as would be performed if the emulated device actually existed.

Using the emulation described above, for example, the functionalities of one or more devices can be combined and recognized as a new single device in an intelligent way. For example, combining and aggregating functionalities of one or more devices in a fully-customizable fashion (e.g., as required and/or specified by a user), can facilitate the emulation of a new single device, e.g., an emulated device.

In some implementations, a user interface can allow users to define (or identify an external data file, or a data transmission over a network, or data output from another application, that specifies) information associated with external devices. The input can define, for example, how a set of context states of the individual external devices should be used to create or represent a context state of the emulated device, and how to generate the input data corresponding to that which would be sent by the emulated device to convey its current context state.

In some implementations, a set of external device context state rules can be used that provide a direct mapping between the set of context states of the external devices to a single context state of the emulated device. Emulated device context state rules can be used that provide a direct mapping between a context state of the emulated device to a function that will generate the required data to represent that state. For example, the data can be in a form that a device driver on a target device is able to interpret.

In some implementations, the storage of external device context state rules can be in an external device context state rules database, and the storage of emulated device context state rules can be in an emulated device context state rules database. The two databases can be provided to an emulated device generator.

In some implementations, an emulated device generator can generate components needed for generation, e.g., a device driver for the emulated device (which will be installed on a target device), and an emulated device application, which can be installed on an intermediary device. In some implementations, the emulated device application can include a context state monitor, a context state rules processor, and a data signal sender, as well as the external device context state rules database and the emulated device context state rules database. The context state monitor, for example, can detect changes to the context states of the external devices.

In some implementations, a context state rules processor can perform various functions, based on the context states of the external devices. For example, the context state rules processor can retrieve external device context state rules from the external device context state rules database, and emulated device context state rules from the emulated device context state rules database. The context state rules processor can also use the retrieved emulated device context state rules to map the set of context states of the external devices to a single context state of the emulated device. The context state rules processor can also use the retrieved emulated device context state rules to map the context state of the emulated device to a function that will generate the required data or signal (interpretable by the device driver) to represent that state. The context state rules processor can also generate the required data (interpretable by the device driver) to represent that state, and send the required data to a data signal sender. The data signal sender can send the data received from the context state rules processor to the device driver.

Figure 1:
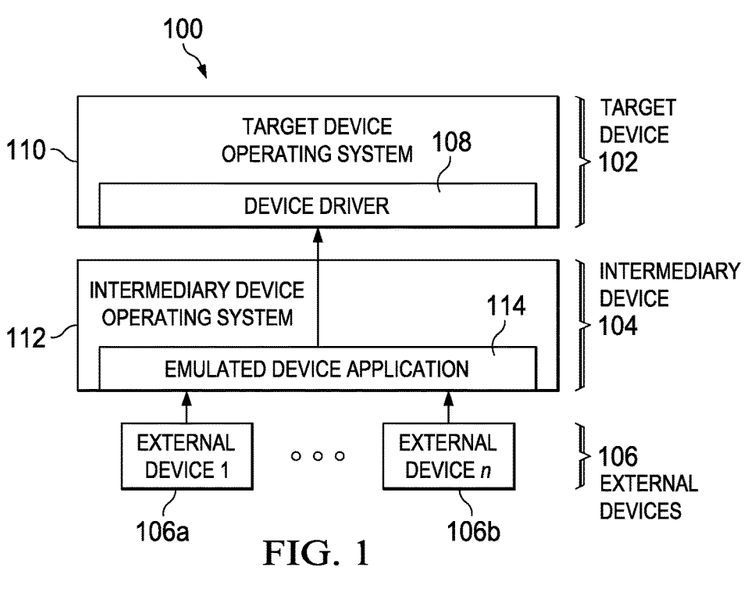
FIG. 1 is a block diagram of a configuration for interactions among a target device, an intermediary device, and external devices.

FIG. 1 is a block diagram of a configuration 100 for interactions among a target device 102, an intermediary device 104, and external devices 106. For example, the target device 102 can be a laptop computer running Windows that is configured to receive signals from a wireless mouse. The intermediary device 104 (e.g., the user's mobile phone) can emulate the wireless mouse. The emulation can occur, for example, using input received from the external devices 106. External device 106a, for example, can be used by the user's left hand to emulate mouse movements along the x-coordinate of a screen. External device 106b, for example, can be used by the user's right hand to emulate mouse movements along the y-coordinate of the screen. Emulation can occur, for example, when signals received by the intermediary device 104 from the external devices 106 are interpreted, and the intermediary device 104 sends a signal to the device driver 108 (e.g., a mouse driver) of the target device 102. Other configurations 100 are possible, and additional intermediary devices 104 and/or external devices 106 can be used, e.g., for other emulations and/or other purposes.

The emulation can be enabled, for example, as a result of a set-up operation that uses input received from a user or from an external data file (or a data transmission over a network, or data output from another application) that describes context states of the external devices 106 and the intermediary device 104. For example, context state rules can map movements by the user using the external devices 106a and 106b to the intermediary device 104. The input can also specify other information describing how functionality of the external devices 106 is to be combined into the emulated device represented by the intermediary device 104.

The target device 102, in addition to including the device driver 108, can include a target device operating system 110. For example, the target device operating system 110 can execute instructions received by the device driver 108, such as instructions executed for an application running on the target device 102. The application, for example, can be an application with which the user is interacting, such as with the external mouse that is emulated by the intermediary device 104 (based on user inputs received from the external devices 106).

The intermediary device 104 (e.g., including an operating system 112), is a device that can host and execute an emulated device application 114. The emulated device application 114, for example, can receive inputs from the external devices 106 and provide instructions for use by the device driver 108. The external devices 106 can receive different types of input, such as one or more of voice, motion, video (i.e., camera), or other inputs that can be provided by a user or received in some other way.

In some implementations, other configurations are possible, such as configurations in which all or part of the emulated device application 114 is resident in the target device 102 (e.g., as part of the device driver 108). Other types of intermediary devices 104 can perform other functions, such as listening for sounds (e.g., audible clicks or other sounds provided by the user for use in signaling certain functions (e.g., mouse clicks, double clicks, dragging, and other operations). In some implementations, external devices 106 can include bracelets worn by the user that, using input from motion sensors, can be used to determine motion (and user selections) in three dimensions. Other types of external devices 106 can include, for example, a mouse, a trackball, a keyboard, a touchpad, a speaker, a motion-sensing device, a composite device, or a game controller. In some implementations, external devices 106 can include applications that may reside in the intermediary device 104 or in the target device 102.

Figure 2:
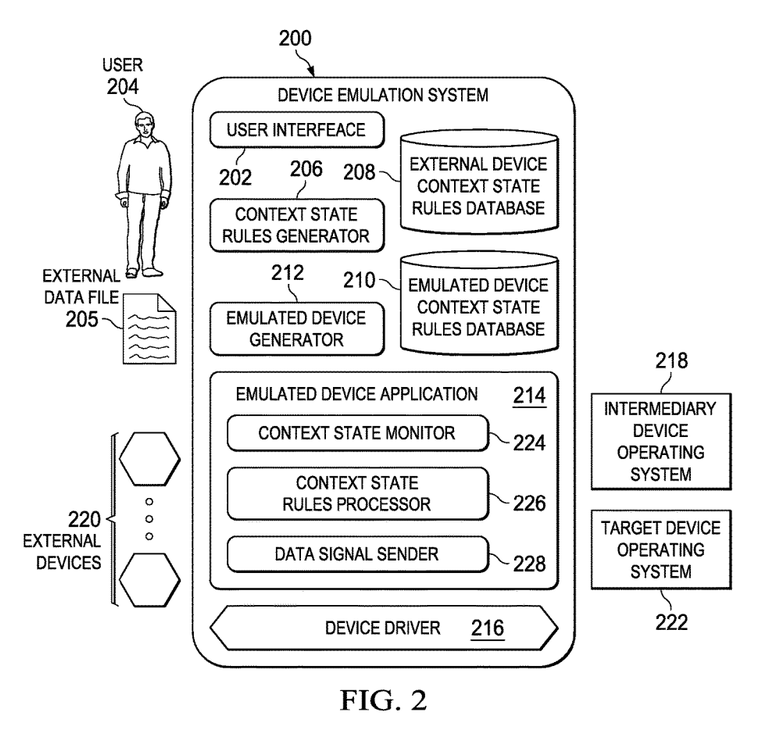
FIG. 2 is a block diagram of device emulation system.

FIG. 2 is a block diagram of device emulation system 200. For example, components of the device emulation system 200, when used in combination, can use one or more devices to emulate a new single device. The device emulation system 200 can also interact with external components, as will be described.

A user interface 202, for example, can be an interface through which input is provided in the initialization stage of use of device emulation. Through user interface 202, for example, a user 204 may provide information that describes how a set of context states of the individual external devices are to be used to create a context state of the emulated device. The input can also provide information that describes how to generate data (e.g., commands) that are to be sent by the emulated device to convey its current context state. The user interface 202 can provide different ways of interacting with users, e.g., through voice input, allowing disabled users to provide input. In some implementations, the user interface 202 may allow for an external data file 205 (or a data transmission over a network, or data output from another application) to be read with the above input, without requiring users to manually provide the above information.

A context state rules generator 206, for example, can use inputs received from the user interface 202 (and/or other sources) to generate two sets of context state rules: external device context state rules, which are stored in an external device context state rules database 208 and emulated device context state rules, which are stored in an emulated device context state rules database 210. Uses of the context state rules are provided below with reference to FIG. 3A. The databases 208 and 210 can be stored, for example, in a database or other file system, or in some other appropriate data storage structure. In some instances, the two databases can be combined into a single database or repository.

An emulated device generator 212, for example, can generate an emulated device application 214 (e.g., the emulated device application 114 described above with reference to FIG. 1). In some implementations, the emulated device generator 212 is also able to create a device driver 216 (e.g., the device driver 108 described above with reference to FIG. 1). For example, creating the device driver 216 can occur when a generic device driver is not available for the emulated device, or in cases where existing device drivers cannot be used with the emulated device.

The emulated device application 214, for example, can be a software application that is able to be executed on the intermediary device (e.g., the intermediary device 104), such as by the operating system 218. The emulated device application 214 can receive inputs from external devices 220, aggregate and interpret the inputs according to entries in the external device context state rules database 208, and send a data signal, according to entries in the emulated device context state rules database 210, to the device driver 216, in order to emulate the emulated device to a target device operating system 222.

The emulated device application 214 can use the external device context state rules database 208 and the emulated device context state rules database 210 during execution of the emulated device. In some implementations, the emulated device application 214 includes a context state monitor 224, a context state rules processor 226, and a data signal sender 228. The context state monitor 224, for example, can detect any changes of the context states of any of the external devices 220. The context state rules processor 226, for example, can aggregate and interpret the current context states of the external devices 220, based on external device context state rules, and creates a single context state of the emulated device. The context state rules processor 226 can also use emulated device context state rules to create a data sequence that can be sent to the device driver 216 in order to represent the context state of the emulated device. The data signal sender 228, for example, can send the data sequence that represents the context state of the emulated device to the device driver 216.

The device driver 216, for example, can execute on the target device operating system 222 and receive data signals from the data signal sender 228. The device driver 216 decodes the received data and sends the current context state of the emulated device to the target device operating system 222.

In some implementations, encryption can be used for one or more components of the device emulation system 200. For example, information that is transmitted between the external devices 106 and the intermediary device 104 can be encrypted before it is sent, e.g., to prevent potential unauthorized use or detection (e.g., of keyboard input).

Figure 3A:
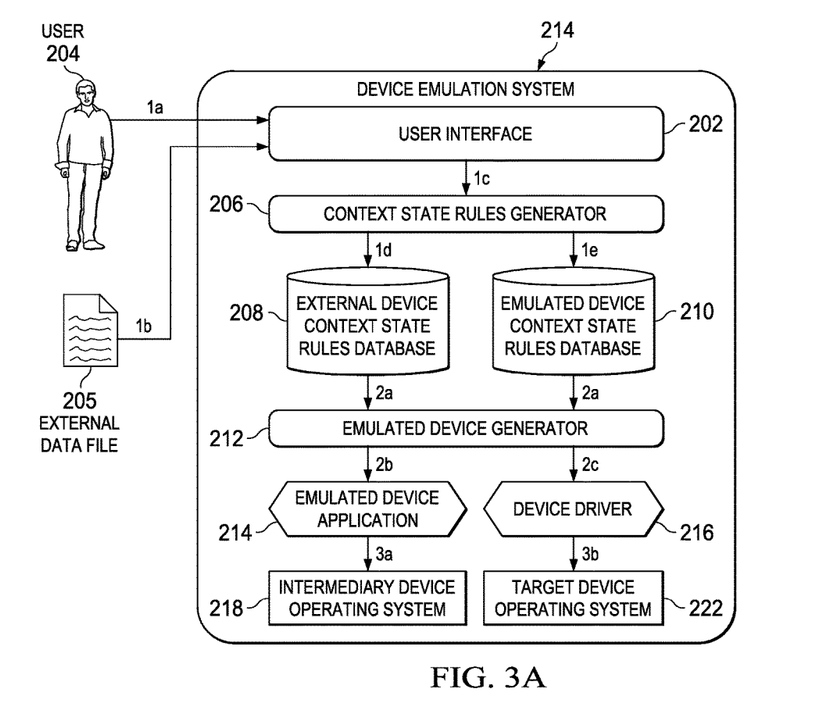
FIGS. 3A and 3B collectively show an example sequence of steps in using external devices for device emulation.
Figure 3B:
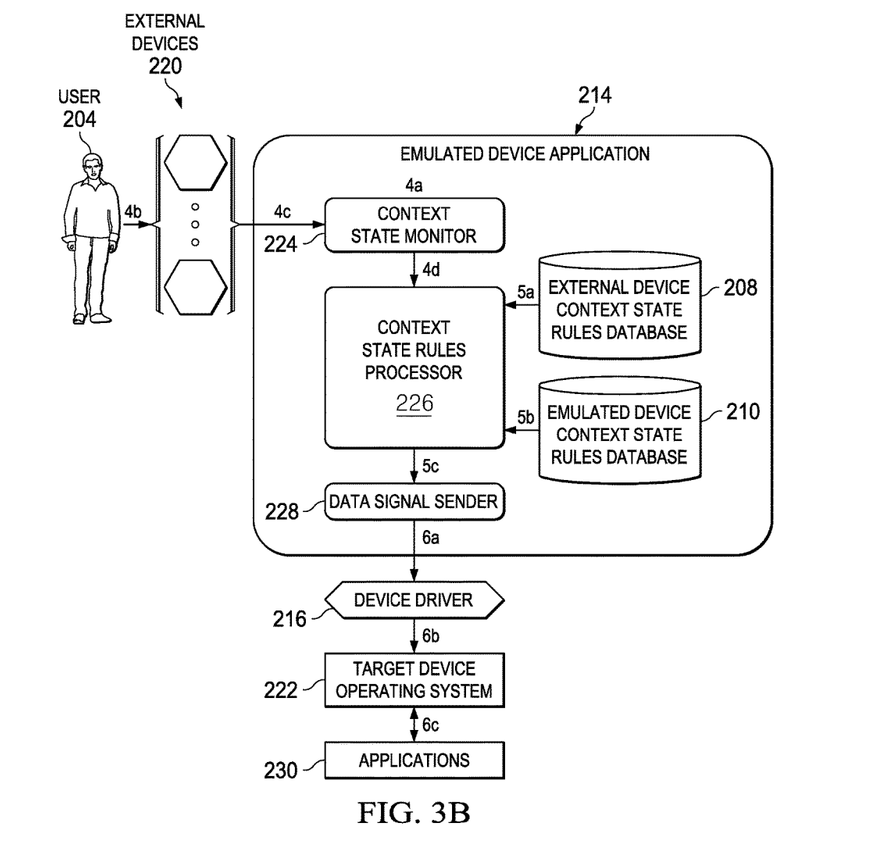

FIGS. 3A and 3B collectively show an example sequence of steps in using external devices for device emulation. For example, the steps can represent steps of the method for the intelligent combination and use of the functionalities of one or more devices to act and be recognized as a new single device. In some implementations, the sequence of steps can be grouped into an initialization stage and an operation stage. For example, FIG. 3A shows example steps undertaken in the initialization stage, and FIG. 3B shows example steps undertaken in the operation stage.

Referring to FIG. 3A, in the initialization stage, the device emulator needs to be initialized before one or more devices can be recognized and used in emulating a new device. In step 1, for example, a user can specify which (and how) external devices are to be used in order to emulate a new single device. Specification of the external user devices can be made in the user interface 202 that allows the user 204 either (at sub-step 1a) to provide input or (at sub-step 1b) identify an external data file (or a data transmission over a network, or data output from another application) that specifies information for the external devices. The information includes information that defines the way in which the set of context states of the individual external devices should be used to create a context state of the emulated device and the way in which the data is to be generated that is to be sent by the emulated device to convey its current context state. At sub-step 1c, for example, the inputs can be provided to the context state rules generator 206, which can generate two sets of context state rules. At step 1d, for example, context state rules for the one or more external devices can be generated and stored in the external device context state rules database 208. At step 1e, for example, context state rules for the emulated device can be generated and stored in the emulated device context state rules database 210.

A context state rule can be defined, for example, as a rule (or function) that specifies what action to take based on a given context state. Furthermore, a context state can be defined as a set of context state parameters, such as:

$$\text{ContextState} = \{\text{ContextStateParameter1}, \ldots, \text{ContextStateParameterN}\} \quad (1)$$

A context state parameter can be defined, for example, as a single parameter that defines one aspect of the complete context state. For example, a context state parameter of a touch screen may be defined by three values: the x- and y-coordinates at which pressure is applied, as well as an amount of pressure applied at that point. A context state for a touch screen, for example, can then be defined as a set of points at which pressure is currently applied to the screen (e.g., limited by the number of points which the screen can detect).

More formally, in some implementations, a context state of a touch screen can be represented as:

$$\text{ContextState}_{TouchScreen} = \{(x_1, y_1, p_1), \ldots, (x_n, y_n, p_n)\} \quad (2)$$

where $x_i$ and $y_i$ represent the x- and y-coordinates of the i-th detected pressure point, respectively, and $p_i$ represents the amount of pressure that is applied at the i-th detected pressure point.

External device context state rules can be defined, for example, as context state rules that provide a direct mapping between the set of context states of the external devices to a single context state of the emulated device. For example, an external device context state rule may be represented as:

$$\{\text{ContextState}_{ExternalDevice1}, \ldots, \text{ContextState}_{ExternalDeviceN}\} \rightarrow \{\text{ContextState}_{EmulatedDevice}\} \quad (3)$$

The way in which the set of context states of the external devices is used to create the context state of the emulated device can be defined through a function $f$. That is, the above representation of an external device context state rule can be represented as:

$$\{\text{ContextState}_{ExternalDevice1}, \ldots, \text{ContextState}_{ExternalDeviceN}\} \rightarrow \{f(\text{ContextState}_{ExternalDevice1}, \ldots, \text{ContextState}_{ExternalDeviceN})\} \quad (4)$$

In some implementations, rules can be stored in this way (e.g., as a function) in the external device context state rule database 208 in one embodiment of the invention.

The way in which the function $f$ operates in the general case, as well as its input parameters, can depend on the way in which the emulated device should be emulated through the external devices. That is, the number and type of context state parameters, as well as the type of external device from which the context state parameters are selected for the function $f$, depend on the way in which the context states of the external devices, and in particular the individual context state parameters of the context state of each external device, are to be used to create the context state of the emulated device.

As an example, consider a user whose disability prevents the user from making arm movements to the left or right, but up and down movements are possible. Two motion-sensing devices, e.g., $Msd_1$ and $Msd_2$, may be used to emulate a mouse, where $Msd_1$ is used to emulate horizontal mouse cursor movement, and $Msd_2$ is used to emulate vertical mouse cursor movement. In this example, for simplicity, emulation of button clicks, wheel scrolling and/or other operations are omitted. Further, assume that the context state of both motion-sensing devices is defined in terms of the x-, y-, and z-coordinates. Also assume that the context state of the mouse is defined in terms of the x- and y-coordinates. More formally:

$$\text{ContextState}_{Msd1} = \{(x_1, y_1, z_1)\}, \quad (5a)$$

$$\text{ContextState}_{Msd2} = \{(x_2, y_2, z_2)\}, \text{ and} \quad (5b)$$

$$\text{ContextState}_{Mouse} = \{(x_3, y_3)\}. \quad (5c)$$

To achieve this representation, a context state rule can be created to map the set of the current context states of $Msd_1$ and $Msd_2$ into a single context state for a single device (e.g., a mouse) by defining an external device context state rule of the form:

$$\{(x_1, y_1, z_1), (x_2, y_2, z_2)\} \rightarrow \{(f_1(y_1), f_2(y_2))\} \quad (6)$$

In this example, the y-coordinate of $Msd_1$ can be mapped to the x-coordinate of the mouse cursor by means of a function $f_1$. Similarly, the y-coordinate of $Msd_2$ can be mapped to the y-coordinate of the mouse cursor by means of a function $f_2$.

Lastly, emulated device context state rules can be defined as context state rules that provide a direct mapping between the context state of the emulated device to a function that will generate the required data (e.g., that the device driver 216 will be able to interpret) to represent that state. In some implementations, an emulated device context state rule can be represented as:

$$\{\text{ContextState}_{EmulatedDevice}\} \rightarrow \{g(\text{ContextState}_{EmulatedDevice})\} \quad (7)$$

where g is a function that takes the current context state of the emulated device as an input and generates the required data to represent that state.

Continuing with the above example, and assuming that the context state of the emulated mouse device is represented as:

$$\text{ContextState}_{Mouse} = \{(x_3, y_3)\}, \quad (8)$$

an emulated device context state rule can be defined as:

$$\{(x_3, y_3)\} \rightarrow \{g(x_3, y_3)\}. \quad (9)$$

In this example, the function g can take as its input the required x- and y-coordinates of the mouse pointer and generate the necessary data that is to be sent by the emulated device to convey its current context state.

Some implementations can use interaction design patterns. Interaction design patterns may be used to simplify the process of defining external devices and their associated behavior (and use in emulating another device). For example, an interaction design pattern can include a subset of the set of external device context state rules, e.g., for a given configuration of external devices. Such interaction design patterns could, for example, be used to specify common interaction movements for specific external devices for users with similar disabilities. Following on the above example, an interaction design pattern could be defined for using $Msd_1$ and $Msd_2$ to emulate a mouse for users who have similar disabilities that prevent them from making arm movements to the left or right, but who are able to make up and down movements (or vice versa). The interaction design patterns could also be used as input to this step relating to the way in which the set of context states of the individual external devices should be used to create a context state of the emulated device. When interaction design patterns are used, the user 204 can select a specific interaction design pattern in sub-step 1a, for example.

At step 2, for example, the external device context state rules database and the emulated device context state rules database can be provided as an input (sub-step 2a) to the emulated device generator 212. Based on the context state rules from these two databases, the emulated device generator 212 can generate (sub-step 2b) the emulated device application 214.

If necessary, an appropriate device driver 216 for the emulated device can also be generated (sub-step 2c). If a generic device driver 216 is used for the emulated device, for example, then the generation of the device driver 216 may be omitted. For example, a generic mouse driver could be used for the emulated mouse of the example provided above. However, the generation of the device driver 216 will be necessary if no generic device drivers exist for the emulated device (e.g., if a user has specified an emulated device that does not yet exist on the market). The generation of the device driver 216 will be necessary if the user wishes to emulate special functionality that is not supported by existing generic drivers, such as for a user that wishes to emulate scroll wheels or additional mouse buttons.

At step 3, for example, the emulated device application 214 can be installed (sub-step 3a) on the user's mobile device (e.g., for use by an intermediary device operating system 218), or any other appropriate device that will act as an intermediary between the external devices and the target device operating system 222. If a device driver 216 has been generated in step 2, for example, then the device driver 216 can be installed (sub-step 3b) on the target device operating system 222. Otherwise, if a generic device driver is not to be used, it can be recommended that the user 204 ensures that an appropriate generic driver will be available on the target device operating system 222. This step completes the initialization stage.

Referring now to FIG. 3B, steps can continue in the operation stage. In some implementations, this stage can be triggered, e.g., one or multiple times, whenever a change in the current context state of any of the external devices is detected. Therefore, it should be noted that steps 4 through 6 can be carried out any number of times, or not at all, depending on the number of times that the context state of any external device changes. This stage ends once the user has completed interacting with the target device through the use of the external devices. Steps 1-3 can also be repeated.

At step 4, for example, the operation of the context state monitor 224 can be started (at sub-step 4a). For example, the user can start interacting (sub-step 4b) with one or more of the external devices 220. The context state monitor 224, for example, can detect (sub-step 4c) any changes to the context state of any external device. The set of current context states of all the external devices $\{ContextState_{ExternalDevice1}, \ldots, ContextState_{ExternalDeviceN}\}$ can be sent (sub-step 4d) to the context state rules processor 226.

At step 5, for example, given a set of the current context states of the external devices, e.g., $\{ContextState_{ExternalDevice1}, \ldots, ContextState_{ExternalDeviceN}\}$, the context state rules processor 226 can use the external device context state rules database 208 to retrieve (sub-step 5a) a context state rule that is appropriate for the given set of context states. For example, given the retrieved external device context state rule:

$$\{ContextState_{ExternalDevice1}, \ldots, ContextState_{ExternalDeviceN}\} \rightarrow \{f(ContextState_{ExternalDevice1}, \ldots, ContextState_{ExternalDeviceN})\} \quad (10)$$

function $f$ can be applied to the set of context states of the external devices to derive a single context state of the emulated device $ContextState_{EmulatedDevice}$. Thereafter, the emulated device context state rules database 210 can be used to retrieve (sub-step 5b) a context state rule that is appropriate for a derived context state of the emulated device.

As an example, given the retrieved emulated device context state rule:

$$\{ContextState_{EmulatedDevice}\} \rightarrow \{g(ContextState_{EmulatedDevice})\} \quad (11)$$

the function g can be applied to the emulated device context state to generate the required data to represent that state. The generated data can be sent (sub-step 5c) to the data signal sender 228.

At this stage in the sequence of steps, it should also be noted that since:

$$ContextState_{EmulatedDevice} = f(ContextState_{ExternalDevice1}, \ldots, ContextState_{ExternalDeviceN}) \quad (12)$$

it is possible, in some implementations, to use a different definition for context state rules, for example, of the form:

$$\{ContextState_{ExternalDevice1}, \ldots, ContextState_{ExternalDeviceN}\} \rightarrow g(f(ContextState_{ExternalDevice1}, \ldots, ContextState_{ExternalDeviceN})) \quad (13)$$

In such implementations using this or different definitions for context state rules, it would not be necessary to have separate databases for external device context state rules and emulated device context state rules. Instead, there may be just one database with context state rules of the form identified in Equation 13. In such implementations, for example, step 5 can retrieve context state rules from this one database. Further, in such implementations, step 1 described above would create only one database with context state rules, and in step 3, only one context state database would be used. Further, the emulated device application would also only have one database. However, in this document there is described (and shown in associated figures) an implementation in which two databases are used for storing context state rules.

At step 6, for example, the data signal sender 228 can send (sub-step 6a) the data received in sub-step 5c to the device driver 216 in a format that is understandable by the device driver 216. The way in which data is sent can depend, for example, on the way in which the intermediary device is connected with the target device for the purpose of data transfer (communication). For example, communication may occur over a wireless network (e.g., Bluetooth), via a USB cable, or in some other way.

Thereafter, the device driver 216 can decode the received data and can send (sub-step 6b) the current context state of the emulated device to the target device operating system 222. The format of the data sent to the target device operating system 222, for example, can be such that the operating system will not be able to detect that it is interacting with an emulated (and thus not real) hardware device. Therefore, the data sent to the target device operating system 222 should be in a format that the operating system can understand, e.g., in a format that would be expected from a real hardware device (e.g., a mouse device driver providing x- and y-coordinates to the operating system).

At sub-step 6b, for example, the device driver 216 can pass information about context state of the emulated device to the target device operating system 222. The target device operating system 222 can use the received data, e.g., by following a normal course of operation of the specific operating system deployed on the target device. For example, target device operating system 222 may pass (sub-step 6c) mouse pointer information to applications 230 on which the mouse pointer is currently pointing.

In some implementations, additional components and/or functionality can be added that would be able to recognize and adapt to changing interaction or movements from the users. For example, if external device context state rules have been initially defined for straight horizontal movements of a user's hand, additional components and/or functionality may be provided to allow deviations from the original defined movements, such as a horizontal movement with slight vertical deviations. Such functionality and/or components may be useful in cases, for example, in which a user has a progressive disability that, as time progresses, further limits the user's ability to interact with a computer. Such functionality may alternatively be used in cases where a user's disability is of a temporary nature and, with time, the user progressively regains an ability to interact with a computer.

Figure 4:
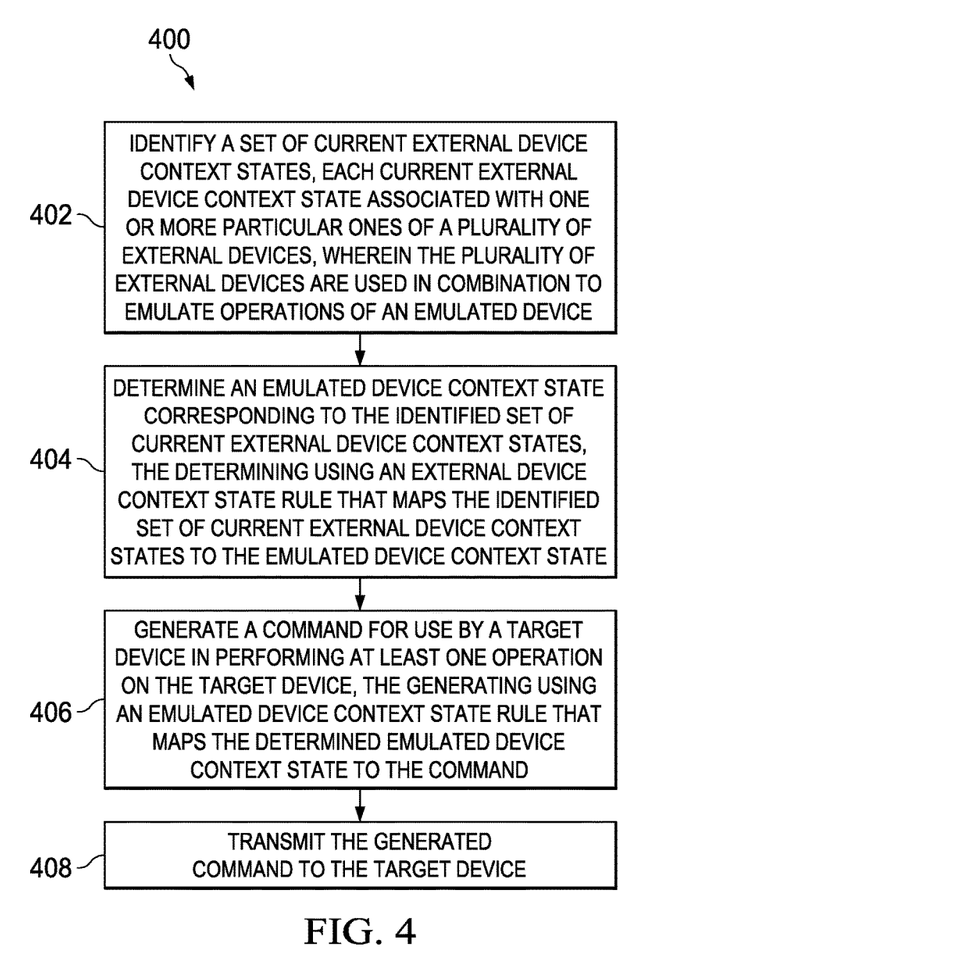
FIG. 4 is a flowchart of an example method for emulating devices.

FIG. 4 is a flowchart of an example method 400 for emulating devices. For clarity of presentation, the description that follows generally describes method 400 in the context of FIGS. 1-3B. However, it will be understood that the method 400 may be performed, for example, by any other suitable system, environment, software, and hardware, or a combination of systems, environments, software, and hardware as appropriate. For example, the device emulation system 200 and/or its components can be used to execute the method 400.

At 402, a set of current external device context states is identified, each current external device context state associated with one or more particular ones of a plurality of external devices, wherein the plurality of external devices are used in combination to emulate operations of an emulated device. For example, the context state monitor 224 can identify current context states in external devices 220, as described above. The external devices 220 may be, for example, touch pads that are to be used in emulating a mouse. In some implementations, an emulated device can be a mouse, a trackball, a keyboard, a touchpad, a speaker, a motion-sensing device, a composite device, or a game controller.

In some implementations, identifying the set of current external device context states is performed in response to detecting a change in the current context state of at least one of the plurality of external devices. For example, the context state monitor 224 can determine, e.g., in input received from the external devices 220, that the user has begun interacting with the external devices 220, such as to perform an emulated mouse operation (e.g., moving the cursor).

In some implementations, a current external device context state includes one or more context state parameters related to the corresponding external device. For example, the current external device context states determined by the context state monitor 224 can include parameters associated with the states on a particular one of the external devices 220.

In some implementations, context state parameters are selected from a group comprising an x-, y-, or z-coordinate associated with a particular external device, a sound received at a particular external device, a pressure received at a particular external device, a type and a number of controls pressed or selected on a particular external device, a frequency with which the controls are pressed or selected, a specific pattern or sequence associated with the pressing or selecting of controls, a speed at which the controls are pressed or selected, an amount of time passed between the pressed or selected controls, a number of pressure points detected on an external device, a speed and direction in which an external device is moved, or a pattern or shape created while moving an external device. For example, context state properties can be associated with one or more aspects associated with an external device 220, such as properties associated with position, geographical location, distance, speed, direction, acceleration, pressure, time, and/or other physical or quantitative properties, one or more aspects associated with the user 204, such as the user's preferences, the user's abilities and disabilities, and/or the user's experience in using computers and particular external devices, one or more aspects associated with the external environment in which the user 204 and device 220 are present, such as GPS-location, current time, the temperature, weather conditions, light level, and/or noise level.

In some implementations, the external device context state rules and the emulated device context state rules are predefined at an initialization stage. For example, the initialization stage can include identifying entries in an external device context state rules database 208 and an emulated device context state rules database 210. The entries can be associated, for example, with a configuration of one or more external devices 220 and an associated intermediary device, as explained in detail below with reference to FIG. 5.

In some implementations, the emulated device is of the same type as at least one of the plural external devices. For example, the emulated device may be a touch pad that is emulated using two or more other touch pads used by the user, e.g., each corresponding to movements in either one of an x- and y-coordinate direction.

In some implementations, more than one emulated device can be emulated using one or more of the same external devices. For example, a configuration can be set up for a user that uses two touch pads (and potentially other external devices) to emulate a mouse, a joy stick (e.g., for a game), and/or other intermediary devices.

At 404, an emulated device context state is determined that corresponds to the identified set of current external device context states, the determining using an external device context state rule that maps the identified set of current external device context states to the emulated device context state. For example, the context state rules processor 226 can aggregate and interpret the current context states of the external devices 220, based on external device context state rules, and create a single context state of the emulated device.

At 406, a command is generated for use by a target device in performing at least one operation on the target device, the generating using an emulated device context state rule that maps the determined emulated device context state to the command. As an example, based on information provided by the context state rules processor 226, the data signal sender 228 can generate a command to be sent to the target device 102.

In some implementations, the generated command is transmitted to a device driver at the target system in a format compatible with the device driver. For example, the command generated by the context state rules processor 226 can be in a format that can be interpreted at the target device 102, e.g., by the target device operating system 222.

At 408, the generated command is transmitted to the target device. As an example, the data signal sender 228 can send the command in the form of a data sequence that represents the context state of the emulated device to the device driver 216.

In some implementations, the emulated device is a virtual emulated device. For example, emulation can occur using a device not originally intended for the functionality which it emulates. For example, consider a user using a desktop computer equipped with a keyboard and mouse. Also, consider that the user has a mobile smart phone (or other device) equipped with a touch screen. Using the touch screen of the mobile device (e.g., connected to and/or communicating with the user's desktop computer), the user may emulate the use of a track pad. That is, the user may move the mouse cursor on the desktop computer by interacting with the touch screen of the mobile device that is communicating with the desktop computer. In this way, it is possible to use the touch screen of the user's mobile device to emulate a track pad, even though the touch screen of the mobile device was not originally intended to be used for that purpose.

Figure 5:
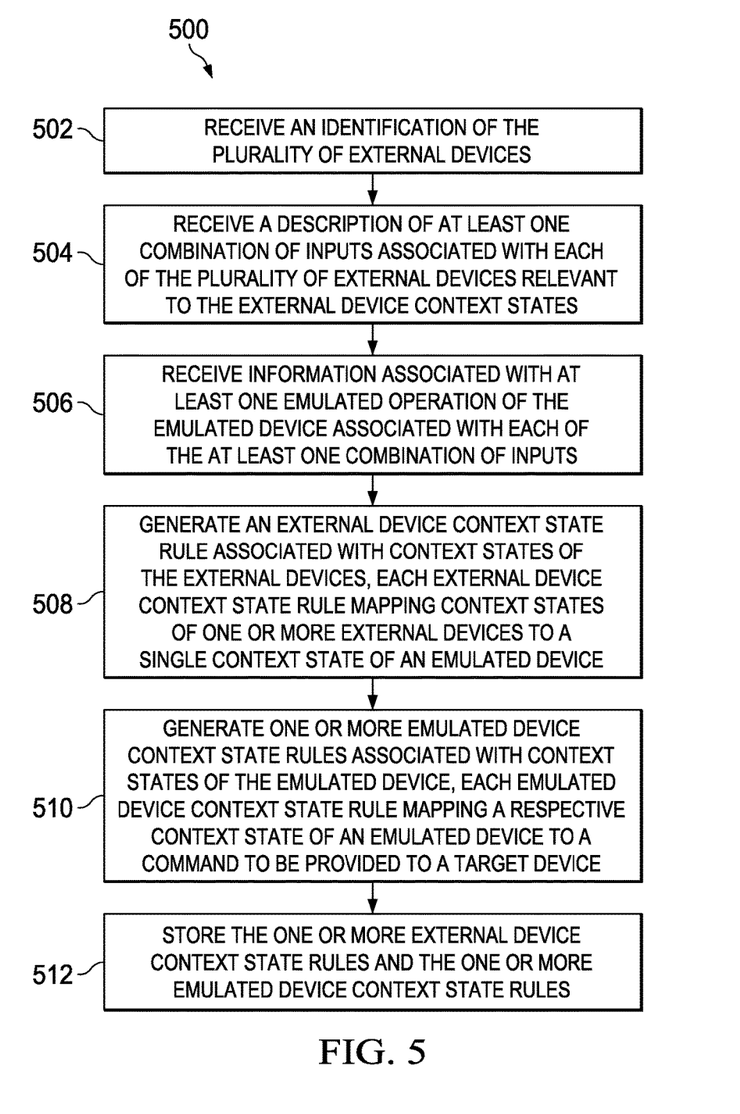
FIG. 5 is a flowchart of an example method for performing an initialization phase used in emulating devices.

FIG. 5 is a flowchart of an example method 500 for performing an initialization phase used in emulating devices. For clarity of presentation, the description that follows generally describes method 500 in the context of FIGS. 1-3B. However, it will be understood that the method 500 may be performed, for example, by any other suitable system, environment, software, and hardware, or a combination of systems, environments, software, and hardware as appropriate. For example, the device emulation system 200 and/or its components can be used to execute the method 500.

At 502, an identification is received, the identification being of the plurality of external devices. For example, using the user interface 202, the user 204 can input information associated with external devices 220 that are to be used to emulate another device. Alternatively (or in addition), the user 204 can identify a file to be read by the user interface 202 that contains information associated with the external devices, such as that the external devices 220 are touch pads of a particular manufacturer and/or operating system. Files, used herein, can be external data files.

At 504, a description is received, the description being of at least one combination of inputs associated with each of the plurality of external devices relevant to the external device context states. For example, the inputs provided by the user 204 (or read from the supplied/identified file) can include information that a first one of the touch pads is to have its left-right movements translated to x-coordinate movements on an emulated mouse. Further, a second one of the touch pads is to have its left-right movements translated to y-coordinate movements on the emulated mouse.

At 506, information is received, the information being associated with at least one emulated operation of the emulated device associated with each of the at least one combination of inputs. For example, the same or different information received at step 504 can identify the states associated with the emulated mouse that correspond to movements of the touch pads.

At 508, an external device context state rule is generated that is associated with context states of the external devices, each external device context state rule mapping context states of one or more external devices to a single context state of an emulated device. For example, the context state rules generator 206 can use the inputs received from (e.g., the user interface 202 and/or a file) to generate entries for the external device context state rules database 208.

In some implementations, the initialization stage further includes the use of an interaction design pattern for facilitating the definition, by the user, of a configuration of at least one external device and an associated emulation device. For example, the user interface 202 can receive an identification of a particular interaction design pattern from a set of candidate interaction design patterns. Each interaction design pattern can identify a configuration of external devices and can include default information for context states and external device context state rules associated with the external devices and emulated device context state rules associated with the emulated devices. For example, a particular one of the interaction design patterns can include information, readily translated (or translatable) to context state rules, that describes how two touch pads can be defined and used to emulate a mouse. The user interface 202 can use information associated with the identified particular interaction design pattern to facilitate the initialization stage.

At 510, one or more emulated device context state rules are generated that are associated with context states of the emulated device, each emulated device context state rule mapping a respective context state of an emulated device to a command to be provided to a target device. For example, the context state rules generator 206 can use the inputs received from (e.g., the user interface 202 and/or a file) to generate entries for the emulated device context state rules database 210.

At 512, the one or more external device context state rules and the one or more emulated device context state rules are stored. The context state rules generator 206, for example, can store the generated external device context state rules entries and emulated device context state rules entries in the external device context state rules database 208 and the emulated device context state rules database 210, respectively.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a Web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communications between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/ or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a Web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A method, comprising:
   identifying, by an emulated device application executing at an intermediary device associated with a particular user, a set of two or more current external device context states, wherein each of the two or more current external device context states are associated with one or more particular ones of a plurality of external devices monitored by the emulated device application, wherein the plurality of external devices are used in combination to emulate input operations of an emulated device, wherein the emulated device is a first type of device associated with inputs comprising physical movements, and wherein the plurality of external devices includes at least a first device and a second device, wherein at least the second device comprises a second type of device different from the first type of device of the emulated device, wherein the second device receives non-movement inputs comprising a non-speech-based sound, and wherein the two or more current external device context states are aggregated to define a combined set of the identified current external device context states for the two or more external devices;
   determining, automatically by the emulated device application, an emulated device context state corresponding to the combined set of the identified current external device context states, wherein the determining comprises identifying, from a plurality of predefined external device context state rules, a particular predefined external device context state rule corresponding to the combined set of the identified current external device context states and mapping the combined set of the identified current external device context states to the emulated device context state, wherein the predefined external device context state rule is a customized rule defined at design time specifically for the particular user based on one or more disabilities of the particular user;
   generating, automatically by the emulated device application at the intermediary device and in response to determining the emulated device context state, an input command in an input format corresponding to an input generated by a physical version of the emulated device for use by a target device in performing at least one operation on the target device, the generating using an emulated device context state rule that maps the determined emulated device context state to the input command; and
   transmitting, by the emulated device application, the generated input command to the target device;
   wherein the external device context state rules and the emulated device context state rules are predefined at an initialization stage, wherein the initialization stage includes:
      receiving an identification of the plurality of external devices;
      receiving a description of at least one combination of inputs associated with each of the plurality of external devices relevant to the external device context states;
      receiving information associated with at least one emulated operation of the emulated device associated with each of the at least one combination of inputs;
      generating an external device context state rule associated with context states of the external devices, each external device context state rule mapping context states of one or more external devices to a single context state of an emulated device;
      generating one or more emulated device context state rules associated with context states of the emulated device, each emulated device context state rule mapping a respective context state of an emulated device to a command to be provided to a target device;

storing the one or more external device context state rules and the one or more emulated device context state rules; and receiving an identification of a particular interaction design pattern from a set of candidate interaction design patterns, each interaction design pattern identifying a configuration of external devices and including default information for context states and external device context state rules associated with the external devices and emulated device context state rules associated with the emulated devices.

2. The method of claim 1, wherein the generated input command is transmitted to a device driver at the target device in a format compatible with the device driver.

3. The method of claim 1, wherein the emulated device is a mouse, a trackball, a keyboard, a touchpad, or a game controller.

4. The method of claim 1, wherein each current external device context state includes one or more context state parameters related to the corresponding external device.

5. The method of claim 4, wherein context state parameters are selected from a group comprising an x-, y-, or z-coordinate associated with a particular external device, a sound received at a particular external device, a pressure received at a particular external device, a type and a number of controls pressed or selected on a particular external device, a frequency with which the controls are pressed or selected, a specific pattern or sequence associated with the pressing or selecting of controls, a speed at which the controls are pressed or selected, an amount of time passed between the pressed or selected controls, a number of pressure points detected on an external device, a speed and direction in which an external device is moved, or a pattern or shape created while moving an external device.

6. The method of claim 1, wherein the emulated device is of the same type as at least one of the external devices.

7. The method of claim 1, wherein identifying the set of current external device context states is performed in response to detecting a change in a context state of at least one of the plurality of external devices.

8. The method of claim 1, wherein more than one emulated device can be emulated using one or more of the same external devices.

9. A computer-readable media, the computer-readable media comprising computer-readable instructions embodied on tangible, non-transitory media, the instructions operable when executed by at least one computer to:

identify, by an emulated device application operating at an intermediary device associated with a particular user, a set of two or more current external device context states, wherein each of the two or more current external device context states are associated with one or more particular ones of a plurality of external devices monitored by the emulated device application, wherein the plurality of external devices are used in combination to emulate input operations of an emulated device, wherein the emulated device is a first type of device associated with inputs comprising physical movements, and wherein the plurality of external devices includes at least a first device and a second device, wherein at least the second device comprises a second type of device different from the first type of device of the emulated device, wherein the second device receives non-movement inputs comprising non-speech-based sounds, and wherein the two or more current external device context states are aggregated to define a combined set of the identified current external device context states for the two or more external devices;

determine, automatically by the emulated device application, an emulated device context state corresponding to the combined set of the identified current external device context states, wherein the determining comprises identifying, from a plurality of predefined external device context state rules, a particular predefined external device context state rule corresponding to the combined set of the identified current external device context states and mapping the combined set of the identified current external device context states to the emulated device context state wherein the predefined external device context state rule is a customized rule defined at design time specifically for the particular user based on one or more disabilities of the particular user;

generate, automatically by the emulated device application at the intermediary device and in response to determining the emulated device context state, an input command in an input format corresponding to an input generated by a physical version of the emulated device for use by a target device in performing at least one operation on the target device, the generating using an emulated device context state rule that maps the determined emulated device context state to the input command; and transmit, by the emulated device application, the generated input command to the target device;

wherein the external device context state rules and the emulated device context state rules are predefined at an initialization stage, wherein the initialization stage includes:

receiving an identification of the plurality of external devices;

receiving a description of at least one combination of inputs associated with each of the plurality of external devices relevant to the external device context states;

receiving information associated with at least one emulated operation of the emulated device associated with each of the at least one combination of inputs;

generating an external device context state rule associated with context states of the external devices, each external device context state rule mapping context states of one or more external devices to a single context state of an emulated device;

generating one or more emulated device context state rules associated with context states of the emulated device, each emulated device context state rule mapping a respective context state of an emulated device to a command to be provided to a target device;

storing the one or more external device context state rules and the one or more emulated device context state rules; and receiving an identification of a particular interaction design pattern from a set of candidate interaction design patterns, each interaction design pattern identifying a configuration of external devices and including default information for context states and external device context state rules associated with the external devices and emulated device context state rules associated with the emulated devices.

10. A system comprising:
memory operable to store content; and
at least one hardware processor interoperably coupled to the memory and operable to perform instructions to:
  identify, by an emulated device application operating at an intermediary device associated with a particular user, a set of two or more current external device context states, wherein each of the two or more current external device context states are associated with one or more particular ones of a plurality of external devices monitored by the emulated device application, wherein the plurality of external devices are used in combination to emulate input operations of an emulated device, wherein the emulated device is a first type of device associated with inputs comprising physical movements, and wherein the plurality of external devices includes at least a first device and a second device, wherein at least the second device comprises a second type of device different from the first type of device of the emulated device, wherein the second device receives non-movement inputs comprising a non-speech-based sound, and wherein the two or more current external device context states are aggregated to define a combined set of the identified current external device context states for the two or more external devices;
  determine, automatically by the emulated device application, an emulated device context state corresponding to the combined set of the identified current external device context states, wherein the determining comprises identifying, from a plurality of predefined external device context state rules, a particular predefined external device context state rule corresponding to the combined set of the identified current external device context states and mapping the combined set of the identified current external device context states to the emulated device context state, wherein the predefined external device context state rule is a customized rule defined at design time specifically for the particular user based on one or more disabilities of the particular user;
  generate, automatically by the emulated device application at the intermediary device and in response to determining the emulated device context state, an input command in an input format corresponding to an input generated by a physical version of the emulated device for use by a target device in performing at least one operation on the target device, the generating using an emulated device context state rule that maps the determined emulated device context state to the input command; and
  transmit, by the emulated device application, the generated input command to the target device;
  wherein the external device context state rules and the emulated device context state rules are predefined at an initialization stage, wherein the initialization stage includes:
    receiving an identification of the plurality of external devices;
    receiving a description of at least one combination of inputs associated with each of the plurality of external devices relevant to the external device context states;
    receiving information associated with at least one emulated operation of the emulated device associated with each of the at least one combination of inputs;
    generating an external device context state rule associated with context states of the external devices, each external device context state rule mapping context states of one or more external devices to a single context state of an emulated device;
    generating one or more emulated device context state rules associated with context states of the emulated device, each emulated device context state rule mapping a respective context state of an emulated device to a command to be provided to a target device;
    storing the one or more external device context state rules and the one or more emulated device context state rules; and
    receiving an identification of a particular interaction design pattern from a set of candidate interaction design patterns, each interaction design pattern identifying a configuration of external devices and including default information for context states and external device context state rules associated with the external devices and emulated device context state rules associated with the emulated devices.

* * * * *